Figure 1:
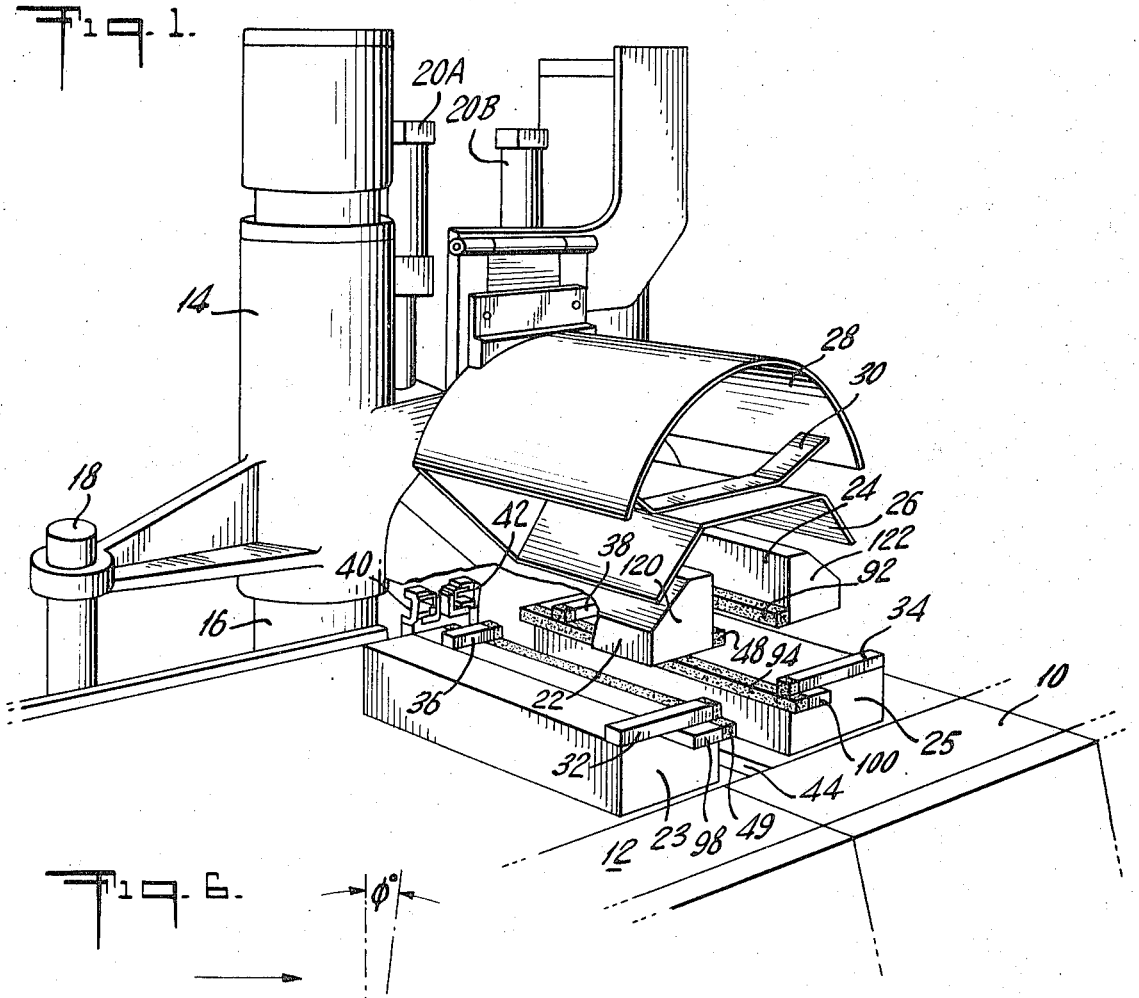
Figure 6:
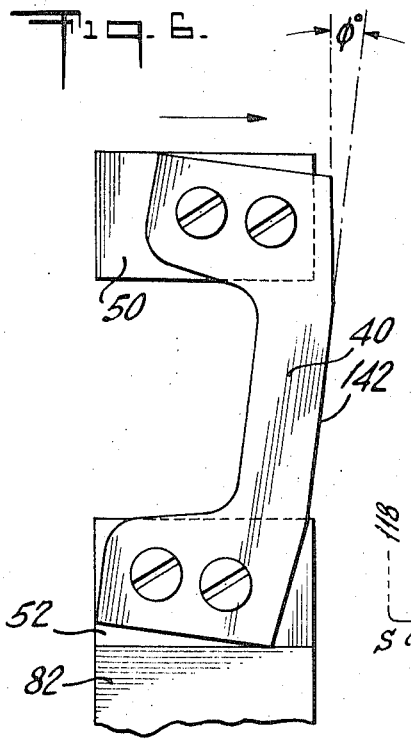
Figure 7:
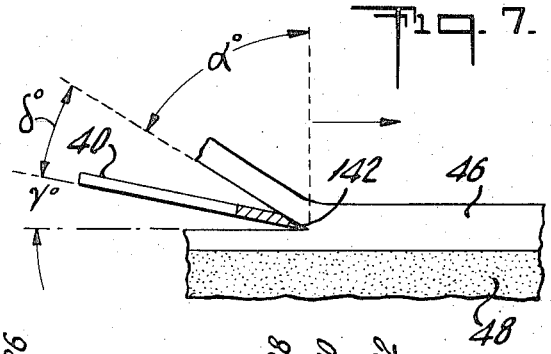
Figure 8:
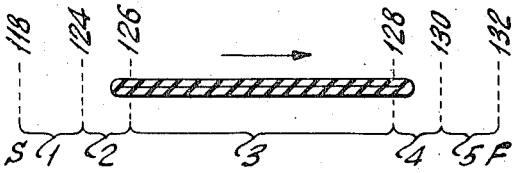
Figures 2, 3:
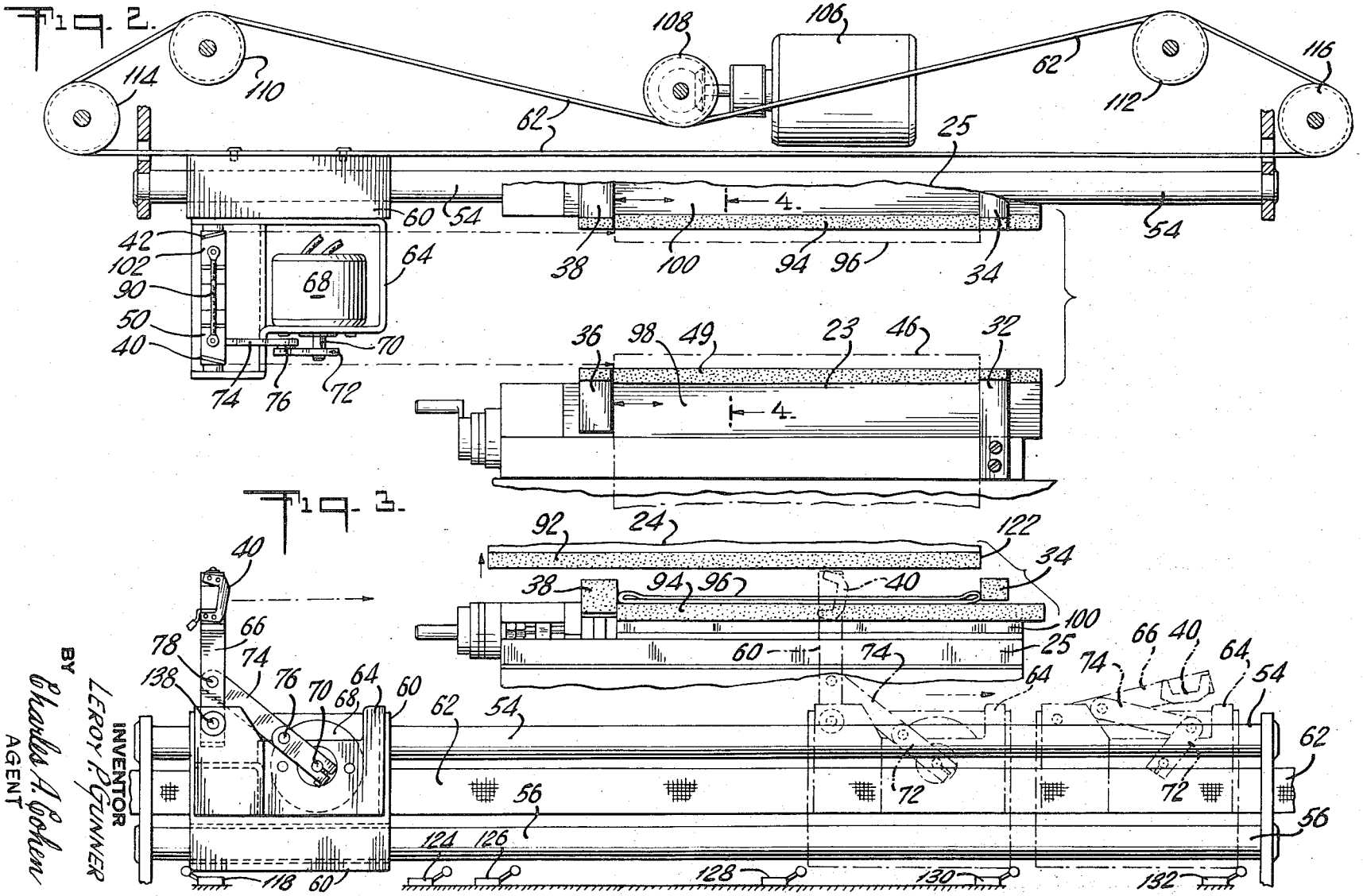
Figure 4:
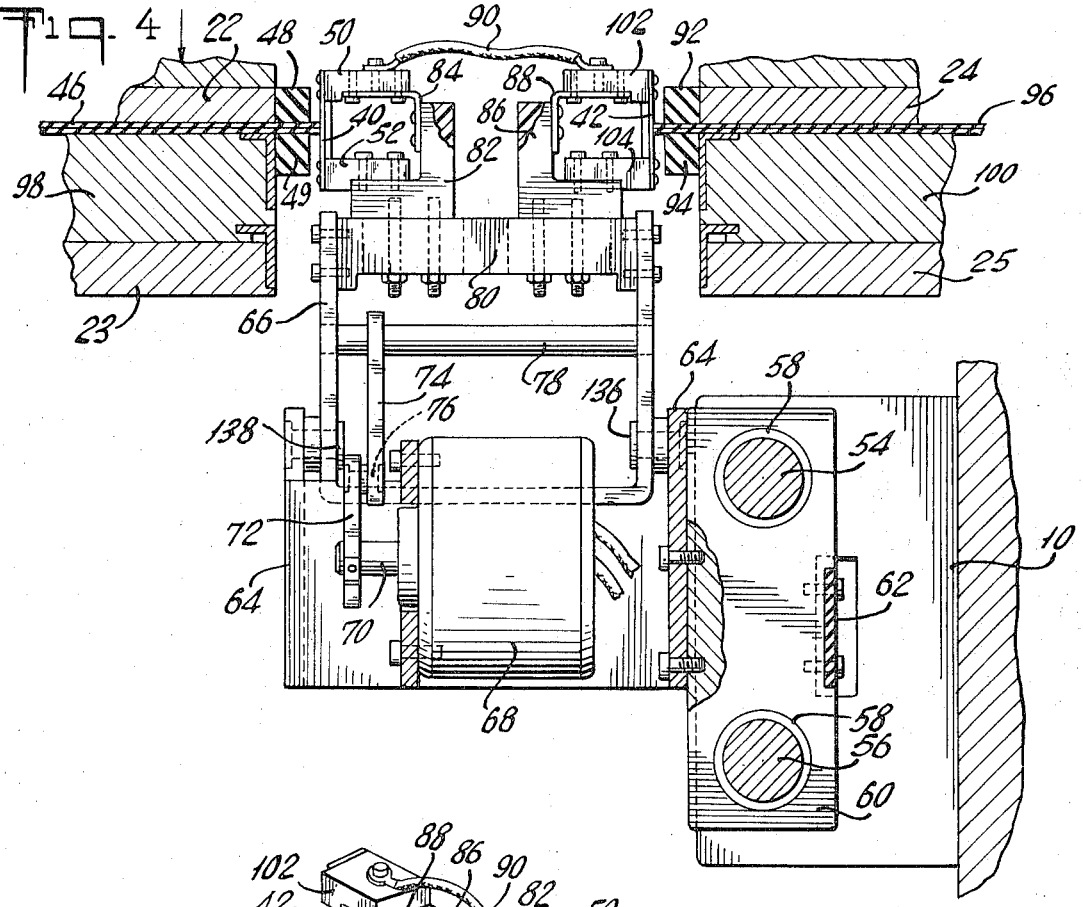
Figure 5:
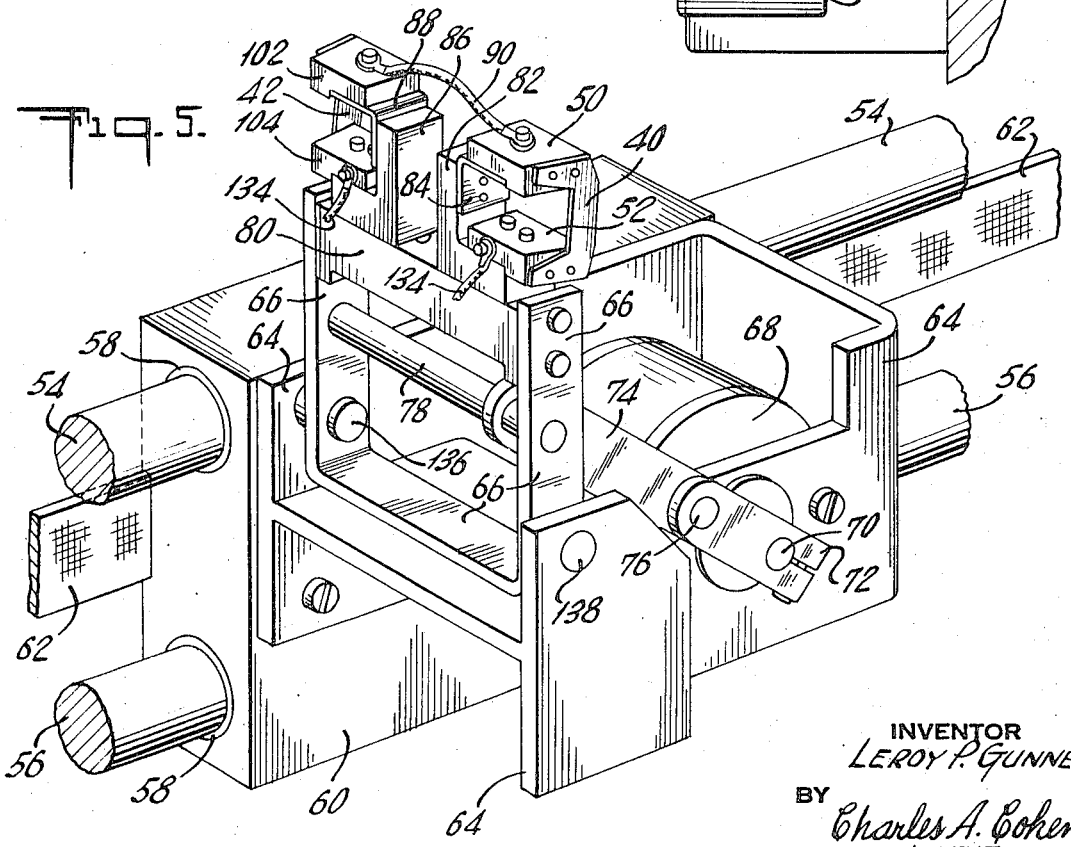

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 10, 1972

903 O.G. 374

T903,032
HOT-KNIFE CUTTER FOR INNER-TUBE SPLICER

Leroy P. Gunner, 764 Belvedere Ave.,
Westfield, N.J. 07090

Filed Aug. 23, 1971, Ser. No. 173,983
Int. Cl. B26d *7/10*
U.S. Cl. 83—171
3 Sheets Drawing. 17 Pages Specification

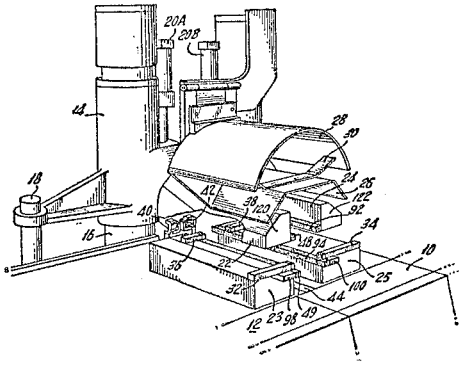

A cutting system for inner-tube butt splicing machines is characterized by a pair of knives in fixed spatial relationship, heated by their resistance to the passage of an electric current through them. The knives, which cut horizontally at a variable speed parallel to the faces of a pair of clamps in coplanar and parallel relationship in which the ends of the unspliced tube are secured, are ground and set to operate within predetermined ranges of rake, bevel, blade relief and cant and are maintained at an appropriate temperature level by coordination of voltage, current and cutting rate.

HOT-KNIFE CUTTER FOR INNER-TUBE SPLICER

Filed Aug. 23, 1971 3 Sheets-Sheet 1

INVENTOR
LEROY P. GUNNER
BY
Charles A. Cohen
AGENT

HOT-KNIFE CUTTER FOR INNER-TUBE SPLICER

Filed Aug. 23, 1971 3 Sheets-Sheet 2

INVENTOR
LEROY P. GUNNER
BY
Charles A. Cohen
AGENT

HOT-KNIFE CUTTER FOR INNER-TUBE SPLICER

Filed Aug. 23, 1971 3 Sheets-Sheet 3

INVENTOR
LEROY P. GUNNER
BY
Charles A. Cohen
AGENT